United States Patent
Jungbluth et al.

(10) Patent No.: US 8,194,308 B2
(45) Date of Patent: Jun. 5, 2012

(54) METHOD AND ARRANGEMENT FOR THE FREQUENCY CONVERSION OF COHERENT OPTICAL RADIATION

(75) Inventors: Bernd Jungbluth, Aachen (DE); Marco Hofer, Aachen (DE); Jens Lohring, Aachen (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 177 days.

(21) Appl. No.: 12/523,336

(22) PCT Filed: Jan. 18, 2008

(86) PCT No.: PCT/DE2008/000087
§ 371 (c)(1), (2), (4) Date: Aug. 4, 2010

(87) PCT Pub. No.: WO2008/086790
PCT Pub. Date: Jul. 24, 2008

(65) Prior Publication Data
US 2010/0296153 A1 Nov. 25, 2010

(30) Foreign Application Priority Data
Jan. 19, 2007 (DE) .......... 10 2007 002 821

(51) Int. Cl.
*G02F 2/02* (2006.01)
*H01S 3/10* (2006.01)
(52) U.S. Cl. ............ 359/328; 359/326; 372/21; 372/22
(58) Field of Classification Search .......... None
See application file for complete search history.

(56) References Cited

U.S. PATENT DOCUMENTS

| | | | |
|---|---|---|---|
| 5,742,626 A * | 4/1998 | Mead et al. .......... | 372/22 |
| 6,816,520 B1 | 11/2004 | Tulloch et al. .......... | 372/22 |
| 2004/0240492 A1 * | 12/2004 | Kojima et al. .......... | 372/21 |
| 2005/0094682 A1 | 5/2005 | Tulloch et al. .......... | 372/22 |

(Continued)

OTHER PUBLICATIONS

*Efficient generation of high-energy picosecond pulses al 355 nm in $BiB_3 O_6$,*:Ghotbi et al; 2005 Conference on Lasers and Electro-Optics, Europe; p. 238.

(Continued)

*Primary Examiner* — Hemang Sanghavi
(74) *Attorney, Agent, or Firm* — Renner Kenner Greive Bobak Taylor & Weber

(57) ABSTRACT

The present invention relates to a method and to an arrangement for the frequency conversion of coherent optical radiation with adjustable wavelength by way of a two-stage non-linear optical process. In the method and the arrangement, a frequency doubling is carried out in a first non-linear optical crystal (301, 302) and a sum frequency generation or a frequency doubling is carried out in a second non-linear optical crystal (401, 402) which is connected downstream. A positively birefringent crystal, in which the frequency doubling is carried out during a phase matching of type I from the extraordinary wave of the output frequency according to the <eeo> scheme, is used as the first non-linear optical crystal (301, 302). The second non-linear optical crystal (401, 402) is chosen such that phase matching is made possible by rotating the crystal in the same spatial plane in which the first crystal (301, 302) must also be rotated during a phase matching. The method and the arrangement can be used to realize an extremely compact conversion arrangement with high conversion efficiency, which conversion arrangement can be used for a broad tuneable wavelength range of the input radiation.

22 Claims, 5 Drawing Sheets

U.S. PATENT DOCUMENTS

| | | | |
|---|---|---|---|
| 2005/0190809 A1 | 9/2005 | Petersen et al. | 372/55 |
| 2008/0101424 A1* | 5/2008 | Wang | 372/21 |
| 2011/0220815 A1* | 9/2011 | Sakuma et al. | 250/504 R |

OTHER PUBLICATIONS

*Optical second harmonic generation properties of $BiB_3O_6$*; Ghotbi et al.; Optics Express pp. 6002-6019; vol. 12, No. 24,; Nov. 29, 2004.

*Nonlinear Conversion of Ti: Sapphire Laser Wavelengths*; Rines et al.; IEEE Journal of Selected Topics in Quantum Electronics; vol. 1, No. 1; Apr. 1995.

*Design and Characterization of a Rugged and Compact Setup for Widely Tunable Harmonic Generation in the Ultraviolet*; Jungbluth et al.; Nonlinear Frequency Generation and Conversion: Materials, Devices, and Applications VI; Proc. of SPIE vol. 6455 645502-1; 2007.

*Widely Tunable Ti: Sapphire Laser with Highly Efficient Difference Frequency Generation in the Visible Spectral Range*; Jungbluth et al.; 2005 Conference on Lasers and Electro-Optics Europe; p. 41.

\* cited by examiner

METHOD AND ARRANGEMENT FOR THE FREQUENCY CONVERSION OF COHERENT OPTICAL RADIATION

TECHNICAL FIELD OF APPLICATION

The present invention concerns a method and an arrangement for the frequency conversion of coherent optical radiation of adjustable wavelength, in which an output frequency of the radiation is converted by way of a two-stage non-linear optical process into a higher frequency, in that a frequency doubling is carried out in a first non-linear optical crystal in a first conversion step, and a sum frequency generation, or a frequency doubling, is carried out in a second non-linear optical crystal in a second conversion step.

The invention thus concerns primarily the field of laser engineering, in particular the field of non-linear optical frequency conversion of broadband tuneable laser sources. The generation of laser radiation with a continuously adjustable wavelength from the green wavelength range through to the UV range represents a preferred application, in particular in the range between 205 nm and 510 nm.

BACKGROUND OF THE INVENTION

In methods and arrangements for frequency conversion of known art high intensity, coherent electromagnetic radiation with an adjustable wavelength in the range between about 680 nm and 1020 nm is coupled into the converter arrangement. Based on the principle of non-linear optical three-wave mixing, in particular of non-linear optical generation of higher harmonics of the output frequency, the fundamental radiation is transformed in the converter arrangement into radiation in the wavelength range between 205 nm and 510 nm. For this purpose three different conversion processes are used depending on the wavelength to be generated, and in particular for the generation of electromagnetic radiation in the wavelength ranges:

from about 340 nm up to about 510 nm, a frequency doubling (SHG: second harmonic generation),
from about 250 nm up to about 340 nm, a frequency tripling (THG: third harmonic generation),
from about 205 nm up to about 250 nm, a frequency quadrupling (FHG: fourth harmonic generation), This fundamental principle is also used in the method and arrangement of the present invention. The boundaries between the individual ranges, as well as the upper boundary of the frequency doubling range, can be displaced by about 10 nm commensurate with the properties of the radiation source used on the input side. The lower boundary of the frequency quadrupling range is based on physical properties of the non-linear optical material BBO (beta barium borate) that as a rule is currently used for a frequency quadrupling. Shorter wavelengths down to about 190 nm can be generated on the output side in an additional converter stage by way of non-linear optical sum frequency generation of the frequency tripled radiation with non-converted components of the fundamental radiation.

Frequency tripling takes place by way of a two-stage non-linear optical process. Firstly, a frequency doubling of a proportion of the fundamental radiation is carried out in a first non-linear optical crystal, the doubler crystal. Then the sum frequency of the frequency doubled radiation generated in the first crystal and the residual fundamental radiation at the output frequency is generated in a second non-linear optical crystal, the tripler crystal. Up to the present time two different conversion schemes have been used for this purpose:

1. SHG type I (ooe) and THG type I (ooe):
   (750-1020) nm|o>+(750-1020) nm|o>→(375-510) nm|e>
   (750-1020) nm|o>+(375-510) nm|o>→(250-340) nm|e>
2. SHG type I (ooe) and THG type II (eoe):
   (750-1020) nm|o>+(750-1020) nm|o>→(375-510) nm|e>
   (750-1020) nm|e>+(375-510) nm|o>→(250-340) nm|e> where the ordinary polarised radiation component in the crystal in question is designated by "o" and the extraordinary polarised radiation component is designated by "e". Suitable optics must be introduced for the necessary polarisation rotation between the two stages of these processes. However in today's prior art no optics of an adequate quality are available for purposes of simultaneous beam shaping or independent modification of the polarisation of the two frequency bands.

There therefore remains on the one hand the option of separating the two radiation fields into the different frequency bands downstream of the first crystal, then to deal with them separately, i.e. to introduce optics to influence beam shape and polarisation, and subsequently to combine them once again upstream of the second crystal. An example of a procedure of this kind can be found in U.S. Pat. No. 6,816,520 B1.

The second, more advantageous option consists in selecting the orientation of the two crystals such that no additional optics are required between the two crystals. This is described, for example, in G A Rines et al., "Non-linear Conversion of Ti:Sapphire Laser Wavelengths", IEEE Journal of Selected Topics in Quantum Electronics, Vol. 1, No. 1, April 1995, Pages 50 to 57. Here the principal section of the tripler crystal is rotated in the transverse direction through 90° relative to the principal section of the doubler crystal, so as to maintain the appropriate conversion condition with the correct polarisation direction of the radiation fields relative to the orientation of the crystal axis. However, this is only possible with the second of the conversion schemes cited above. The first option, in contrast, can be introduced in principle using both conversion schemes, but has the disadvantage of high sensitivity to alterations of direction of the input beam. Because of dispersive refraction, alterations of direction of this kind lead to a relative displacement of the two beams in the tripler crystal and thus to a lower conversion efficiency.

The second option is advantageous since a near-perfect spatial superposition of fundamental and frequency-doubled radiation inherently exists downstream of the doubler crystal, which is preserved up to entry into the tripler crystal. However, the rotation of the tripler crystal relative to the doubler crystal leads to a restriction in the conversion of broadband tuneable radiation. For radiation that can be tuned in wavelength the crystals must be additionally rotated in the plane of the principal section, in order to fulfil the phase matching necessary for an efficient conversion process for the different wavelengths by way of so-called angle tuning. With an orientation of doubler crystal and tripler crystal rotated by 90° these crystals must then be rotated in two planes at right-angles to one another when adjusting for different wavelengths of the fundamental radiation. This leads to an arrangement that is not very compact.

Furthermore on account of the parallel displacement of the beams generated during rotation of the crystals an arrangement of this kind requires tripler crystals with large apertures. These are correspondingly expensive. The larger volume in combination with the relatively poor thermal conductivity also exacerbates the maintenance of an even temperature in the crystals. As a result of the crossed orientation of the non-linear crystals a migration of the extraordinary polarised radiation fields occurs in both transverse directions, called walk-off. In order to reduce the consequences of this effect in terms of limiting efficiency and reducing beam quality, the beam cross-section in the crystals must have a comparatively large semi-axis in both transverse directions. For a given input power, however, this limits the intensity of the radiation field that determines efficiency. The second of the conversion schemes cited above is therefore deployed primarily for laser sources with a large pulse power and a low repetition rate (less than 100 Hz), but not for more modern lasers with a high repetition rate (more than 1 kHz) and a comparatively small pulse power.

M Ghotbi et al., "Efficient generation of high-energy picosecond pulses at 355 nm in $BiB_3O_6$", 2005 Conference on Lasers and Electro-Optics Europe, Page 238, disclose a method for multi-stage frequency conversion in which a positively birefringent crystal with a type I phase matching is introduced for both first and second crystals. Frequency conversion takes place in both crystals according to the (eeo) conversion scheme. Here the two crystals must be rotated in different spatial planes for purposes of a phase matching.

The object of the current invention consists in specifying a method and also an arrangement for the frequency conversion of coherent optical radiation, that can be tuned in wavelength, in a two-stage non-linear optical process, which enable a high conversion efficiency with a compact mode of construction of the arrangement.

PRESENTATION OF THE INVENTION

The object is achieved with the method and the arrangement according to the patent claims 1 and 14. Advantageous embodiments of the method and the arrangement are the subject of the dependent claims, or can be extracted from the following description and the examples of embodiment.

In the proposed method for frequency conversion of optical radiation of adjustable wavelength, i.e. of radiation from an optical radiation source with adjustable wavelength, in which an output frequency of the radiation is converted into a higher frequency in a two-stage non-linear optical process, a frequency doubling is carried out in a first conversion step in a first non-linear optical crystal, and a sum frequency generation or a frequency doubling is carried out in a subsequent second conversion step in a second non-linear optical crystal. Here the fundamental radiation is coupled into the first non-linear optical crystal such that at least one extraordinary wave propagates in the crystal at the output frequency. The method is distinguished primarily in that a positively birefringent crystal, for example a BIBO (bismuth triborate), is introduced as a first non-linear optical crystal, in which a frequency doubling takes place with a type I phase matching from the extraordinary wave at the output frequency according to the (eeo) scheme, such that an ordinary wave is generated at double the output frequency. Here the second non-linear optical crystal is selected such that a phase matching is enabled by rotation of the crystal in the same spatial plane in which the first non-linear optical crystal must also be rotated for purposes of a phase matching. Here "fundamental radiation" is to be understood as the radiation of the radiation source deployed at the output frequency, which for purposes of frequency conversion is coupled into the converter arrangement.

For the method and the related arrangement the same radiation sources can be deployed on the input side as in the conversion schemes of known art in the prior art. In general this concerns coherent radiation sources of high radiance, which emit in a longer wavelength region of the electromagnetic spectrum (VIS and/or NIR), wherein the output wavelength is adjustable, i.e. tuneable, within certain limits and the spectral line width is significantly narrower when compared with this tuning range. Ti:sapphire lasers are examples of radiation sources of this kind; these can have a tuning range between 670 nm and 1050 nm. Other radiation sources of tuneable coherent radiation in the visible and infrared spectral regions can, of course, also be deployed, such as, for example, optical parametric oscillators (OPO), dye lasers, diode lasers with an external cavity, or other tuneable solid state lasers.

Selection of a positively birefringent non-linear optical crystal for the frequency doubling in conjunction with the suitable selection of the second non-linear optical crystal ensures that a phase matching of both crystals in the event of alteration of the input wavelength can take place by rotation in the same spatial plane and no additional polarisation rotation of the radiation need take place between the two crystals. The two crystals can thus be arranged directly one behind the other without any interposed optics for purposes of beam shaping or alteration of the polarisation. No separation and recombination of different frequency bands is necessary. The polarisation directions of all radiation fields involved are in each case oriented such that the axes of rotation of both non-linear optical crystals stand parallel for a phase matching by way of angle tuning. This makes possible a very compact arrangement, which moreover is insensitive to alterations of the beam direction on the input side.

The frequency-converted radiation can be deployed in many technical fields, primarily in the field of laser measurement engineering, for example, for purposes of high-sensitivity analysis of materials by way of laser-SNMS (secondary neutral mass spectrometry with laser-aided post-ionisation). Other established fields of application are atmospheric studies, LIDAR (Light Detection and Ranging), life sciences, and spectroscopy.

The arrangement proposed for execution of the method accordingly comprises a first non-linear optical crystal for a frequency doubling, a second non-linear optical crystal, located downstream of the first non-linear optical crystal, for a sum frequency generation or a frequency doubling, optics located upstream of the first non-linear optical crystal to generate a beam waist in the region of the two crystals, and in each case a device to rotate the two crystals for a phase matching at different wavelengths of the fundamental radiation. The first non-linear optical crystal is a positively birefringent crystal, in which a frequency doubling takes place with a type I phase matching from an extraordinary wave at the output frequency according to the <eeo> scheme, so that an ordinary wave is generated at double the output frequency. The second non-linear optical crystal is selected according to the method such that a phase matching is enabled by rotating the crystal in the same spatial plane in which the first non-linear optical crystal must also be rotated for purposes of a phase matching.

A particular advantage of this arrangement and the related method consists in the fact that crystals for different conversion processes can be fitted onto the same rotation mechanisms in a plurality of planes, one above the other. A total system for doubling, tripling and quadrupling of the frequency, i.e. with three different planes, with switching possible between them, is thus significantly more compact to realise than in the conversion schemes of known art from the prior art. The arrangement is thus also significantly less sensitive with regard to mechanical misalignment.

In an advantageous embodiment of the proposed method the fundamental radiation is coupled into the first non-linear optical crystal such that both an ordinary and an extraordinary wave propagate in the crystal at the output frequency. This can occur by the arrangement of a suitable polarisation rotator upstream of the first crystal. Alternatively the fundamental radiation can also be correctly polarised already, or, with some loss of efficiency, non-polarised radiation can be coupled into the first crystal. In the second non-linear optical crystal with a type I phase matching a sum frequency is then generated from the ordinary wave of the fundamental radiation and the ordinary wave in the frequency-doubled radiation according to the <ooe> scheme. The conversion scheme in this embodiment is thus composed of SHG type I (eeo) and THG type I (ooe).

In a further embodiment a second non-linear optical crystal is selected, with which with a type II phase matching a sum frequency is generated from the extraordinary wave of the fundamental radiation and the ordinary wave of the frequency doubled radiation according to the <eoe> scheme. The effective non-linearity of the <eoe> process for the tripling is in fact less than in the <ooe> process of the previous embodiment. However, one is not dealing here with a bypass scheme, so that in principle the total fundamental energy deployed is available for the two process steps, whereas in the previous embodiment the extraordinary polarised power component that is not completely converted in the first conversion step is always lost for the second conversion step. With appropriate design the arrangement in this further embodiment can therefore be operated at least as efficiently as in the previous embodiment, if the total power of the fundamental radiation is coupled into the first crystal with extraordinary polarisation.

In a further embodiment a frequency quadrupling is carried out with the second non-linear optical crystal. Here in the second non-linear optical crystal with a type I phase matching a frequency doubling of the ordinary wave of the frequency-doubled radiation is carried out according to the <ooe> conversion scheme. Here the frequency-doubled radiation generated in the first crystal also already has the correct polarisation state for the subsequent quadrupling step in the second non-linear optical crystal.

The two crystals can be arranged very close to one another, so that their separation even with efficient focusing is still significantly less than a half Rayleigh length. No optics need be introduced for purposes of beam shaping or alteration of the polarisation state of the two radiation fields between the crystals. The beam shaping takes place for both conversion steps, or process stages, by way of the common optics that are located upstream of the first crystal, the doubler crystal. Here in general an elliptical beam shape is adjusted in the non-linear crystal, so as to adjust as large a spatial overlap of the beams in the tripling crystal (or quadrupling crystal) as possible for a given walk-off, and at the same time to generate a high intensity for a given input power. Here the large semi-axis of the beam cross-section in the doubler crystal should be at least as large as the walk-off, for a given length of the doubler crystal. Here the beam shaping optics advantageously have the option of varying the location of the beam waist in the region between the two crystals for purposes of power optimisation.

In the proposed arrangement the principal sections of the two crystals are preferably oriented relative to one another in anti-parallel, since the beam displacement during rotation of the first crystal for a phase matching is then at least partially compensated by a beam displacement in the opposite sense during rotation of the second crystal for a phase matching. The quality of this passive compensation can be optimised by way of matched lengths of the two crystals. A further optical element of a passive dielectric material is preferably arranged on a third rotation device in the beam direction downstream of the two crystals, in a cuboid shape, for example, to compensate for any residual beam displacement downstream of the two conversion stages. The setting angle required in each case for this compensation can be automatically set as a function of output wavelength by way of a table of values analytically calculated or determined from measurements, or can be actively controlled in combination with a position-sensitive sensor.

In a very advantageous embodiment one of the embodiments for a frequency tripling and the embodiment for a frequency quadrupling are combined with one another and/or with an embodiment for pure frequency doubling into a single structure. For this purpose the crystals for the respective processes can be fitted in planes lying one above the other on the same rotation devices, for example, turntables. In this case a deflection arrangement that can switch the beam guides the fundamental radiation either into the frequency doubling plane, the frequency tripling plane, or the frequency quadrupling plane, depending on the desired wavelength to be generated.

In an advantageous further development of the arrangement or method at least one of the three processes (SHG, THG and FHG), preferably all three processes, is distributed on a plurality of crystals. Each of these crystals is then in each case better optimised for more particular (limited) wavelength ranges within the whole conversion range of the arrangement, in particular with regard to the surface coating, than only one crystal for the whole range, and for a phase matching accordingly need not be rotated so far in angle. By arrangement of these crystals for different wavelength ranges in further planes the whole tuning or conversion range can then be covered.

SHORT DESCRIPTION OF THE DRAWINGS

In what follows the proposed method and the related arrangement are briefly elucidated by way of examples of embodiment in conjunction with the drawings. In the figures.

WAYS FOR CARRYING OUT THE INVENTION

The following examples of embodiment show various embodiment options of the proposed arrangement for the frequency conversion of the fundamental radiation of a Ti:sapphire laser, which can be tuned in the wavelength range between 750 and 1020 nm. Examples of lasers of this kind can be found, for example, in the already-cited U.S. Pat. No. 6,816,520 B1, in B Jungbluth et al., "Resonator Designs of Widely Tuneable Ti:Sapphire Lasers Covering a Large Pulse Energy Range", Advanced Solid-State Photonics 2005, Technical Digest, MF40, 2005 or in B Jungbluth et al., "High Performance, Widely Tuneable Ti:Sapphire Laser with Nanosecond Pulses", Photonics West LASE Symposium 2006, Proceedings of SPIE, [6100-20], 2006.

Figure 1:
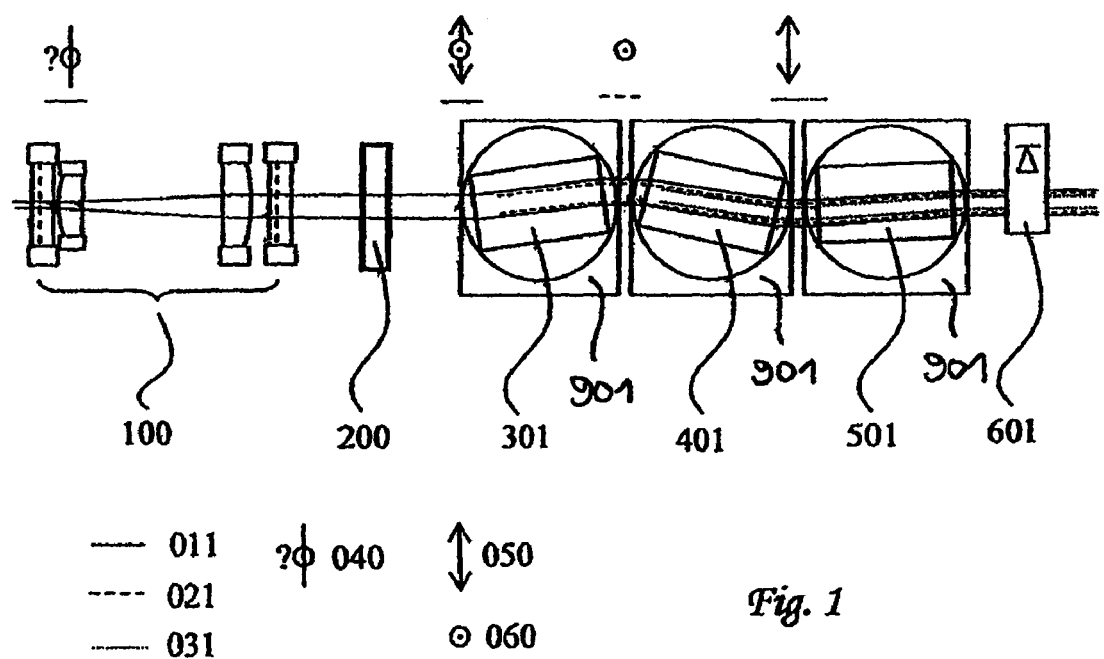
FIG. 1 shows a first example of an arrangement according to the present invention in plan view.

In the example of FIG. 1 a frequency tripling of the fundamental laser radiation takes place in a two-stage non-linear optical process, which in this arrangement, as also in the arrangements shown in the other examples of embodiment, can be tuned between 750 and 1020 nm. In this example the following conversion scheme is used:

SHG type I (eeo) and THG type I (ooe):
(750-1020) nm|e>+(750-1020) nm|e>→(375-510) nm|o>
(750-1020) nm|o>+(375-510) nm|o>→(250-340) nm|e>

The arrangement selected for a frequency tripling is composed of two non-linear optical crystals 301, 401, which are arranged one downstream of the other in the direction of the laser beam. Each of the crystals 301, 401 is arranged on a turntable 901, by way of which the angle tuning for a phase matching takes place. In this embodiment an achromatic polarisation rotator 200 is introduced upstream of the conversion unit formed by the two crystals; this influences the original polarisation state 040 of the fundamental radiation emitted from the laser such that both an ordinary component 060 and also an extraordinary component 050 propagate in the first crystal 301, the doubler crystal. In the form of a bypass scheme only the extraordinary polarised component 050 is converted, i.e. doubled in frequency, in the doubler crystal 301, while the ordinary polarised component 060 is transmitted unconverted. The ordinary polarised component of the laser radiation output frequency, the extraordinary polarised component of the laser radiation output frequency still remaining after a frequency doubling, together with the ordinary polarised radiation at the doubled frequency 021, thus exit the first crystal 301, and enter the adjacent second crystal 401, the tripler crystal. In the latter the ordinary polarised radiation at the fundamental frequency 011, i.e. the output frequency, and the doubled frequency 021 are then present and here can effectively be converted according to a type I process into radiation at the triple frequency 031.

By way of the selected arrangement with a positively birefringent crystal 301 and a suitably selected crystal 401, for example, a BBO, angle tuning for a phase matching can take place for both crystals by rotation in the same (spatial) plane, as can be seen in FIG. 1. Without any additional interposed optics or polarisation rotating elements the two crystals can be arranged very closely one downstream of the other. Beam shaping takes place for both crystals by way of the common optics 100, which are located upstream of the doubler crystal.

In this arrangement, as also in the following examples of embodiment, the principal sections of the two crystals 301, 401 are aligned in anti-parallel to one another. In this manner the beam displacement during angular rotation of the doubler crystal 301 can be at least partially compensated by a beam displacement in the opposite sense during angular rotation of the tripler crystal 401. Any residual beam displacement can be compensated by a suitable additional compensator 501, which in the present examples of embodiment is realised in the form of a material block of cuboid shape that is transparent to the wavelengths generated. This compensator 501 is also mounted on a turntable 901, wherein the opposing beam displacement required for compensation can be adjusted by way of rotation.

By way of the dividing ratio adjusted with the polarisation rotator 200 between the extraordinary and ordinary polarised components of the fundamental radiation in the doubler crystal 301 the optimal intensity ratio of fundamental and doubled radiation can be adjusted for each wavelength and output power of the laser in the tripler crystal 401. Thus an optimal conversion efficiency of the arrangement can always be adjusted for different working points of the fundamental laser source.

In the examples of embodiment represented the power of at least one of the radiation fields is measured in a low loss manner with a power measuring unit 601 under operating conditions. This measurement is preferably used for controlled adjustment of the phase matching angle of the two non-linear optical stages as well as for controlled adjustment of the polarisation direction with the aid of the polarisation rotator 200. For this purpose both the polarisation rotator and also all turntables 901 can be adjusted using motors, and controlled by way of a control unit not represented in the figure. Here the polarisation rotator 200 and the turntables 901 are in each case controlled using a suitable controller to a maximum conversion efficiency, i.e. to a maximum output power for the frequency-tripled radiation.

By automatic control of the turntable 901 for the compensator 501 the beam displacement can also automatically be compensated; this displacement ensues at different wavelengths of the tuneable laser because of the different angle settings of the two crystals for a phase matching. For this purpose a table of values, either analytically calculated or determined from measurements, can be prescribed, on the basis of which the rotation of the compensator 501 takes place as a function of the incoming fundamental wavelength. This rotation can also be controlled alternatively or in combination with the aid of a position-sensitive detector, not represented, which detects a deviation of the frequency-tripled output beam from the desired beam axis. These statements apply also to the following embodiments.

With some loss of performance the polarisation rotator 200 can also be dispensed with, if on the input side a polarisation state of the fundamental laser radiation is present at the converter unit that has both a component with ordinary polarisation and also a component with extraordinary polarisation in the doubler crystal.

Directional instabilities of the input beam in the otherwise critical direction of the non-linear crystals for the conversion efficiency in the arrangement described lead in the first order simply to an alteration of the phase matching angle, which is updated by way of the performance monitoring function. The beam superposition of fundamental and frequency-doubled beams in the sense of a spatial overlap in the tripler crystal 401 is independent of the beam direction of the input beam. Just the absolute location, here irrelevant, and the beam direction in the tripler crystal are affected. The latter is compensated by the readjustment of the phase matching angle. BIBO is, for example, suitable as a crystal material for the frequency doubling step. KDP (potassium dihydrogen phosphate), BBO or CLBO ($CsLiB_6O_{10}$) are, for example, suitable as materials for the frequency tripling step.

Figure 2:
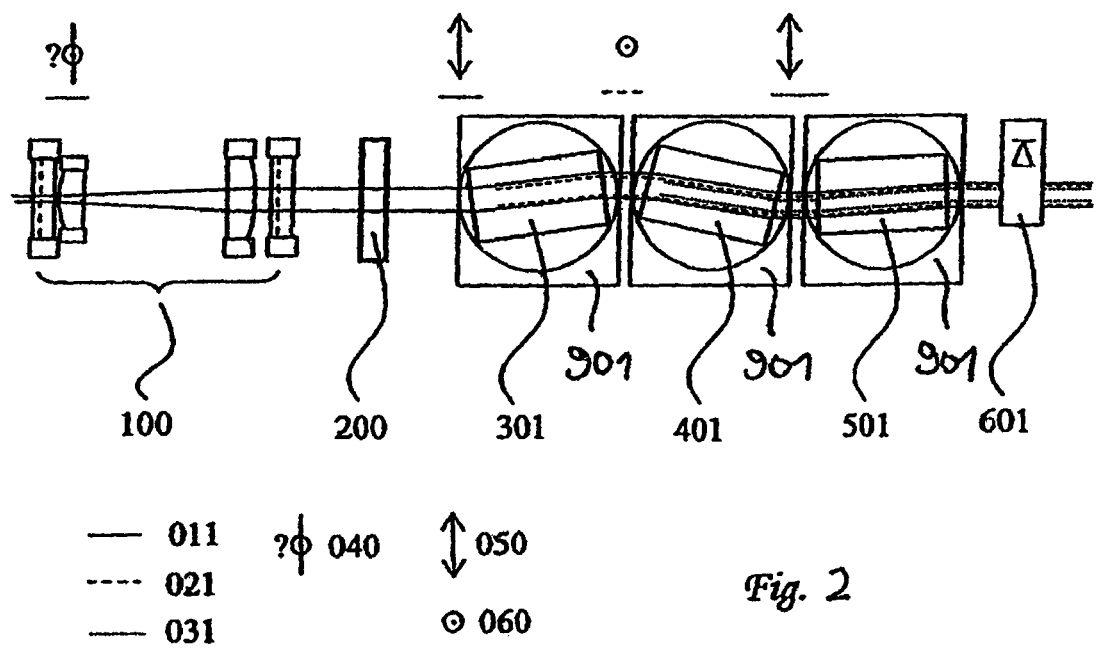
FIG. 2 shows a second example of an arrangement according to the present invention in plan view.

FIG. 2 shows a further example of a possible embodiment of the proposed arrangement. In this arrangement the following conversion scheme is used:

SHG type I (eeo) and THG type II (eoe):
(750-1020) nm|e>+(750-1020) nm|e>→(375-510) nm|o>
(750-1020) nm|e>+(375-510) nm|o>→(250-340) nm|e>

The fundamental arrangement of the individual crystals 301, 401, the optics 100, the polarisation rotator 200, the compensator 501 as well as the performance measuring unit 601 corresponds to that of FIG. 1. The section direction of the tripler crystal 401 is just selected in this embodiment such that the above conversion scheme is fulfilled. The effective non-linearity of the <eoe> process for the tripling procedure is in fact less than in the case of the previously described <ooe> process. However, one is not dealing here with a bypass scheme, i.e. in principle the whole of the energy fundamentally deployed is available to the two process stages, whereas in the example previously dealt with the extraordinary polarised power component that is not completely converted in the first conversion step is always lost for the second conversion step. With appropriate design the arrangement of FIG. 2 can therefore be operated at least as efficiently as the arrangement of FIG. 1. BIBO, can, for example, be used as the material for the doubler step, and BBO, for example, for the tripler step.

In the arrangement of FIG. 2 the element for polarisation rotation 200 is not required if, on the input side, the fundamental radiation already has the correct polarisation direction (e). Here no optimisation of the overall efficiency and thus of the power ratio of the fundamental and frequency-doubled radiation in the tripler crystal can be carried out by adjustment of the input side polarisation direction. Otherwise all the advantages and embodiment options that have already been elucidated in conjunction with the arrangement of FIG. 1 are maintained. In particular here too the two crystals can be positioned with a small separation without intermediate optics. Wavelength tuning by way of angle tuning takes place similarly for both crystals by way of rotation in the same spatial plane.

Figure 3:
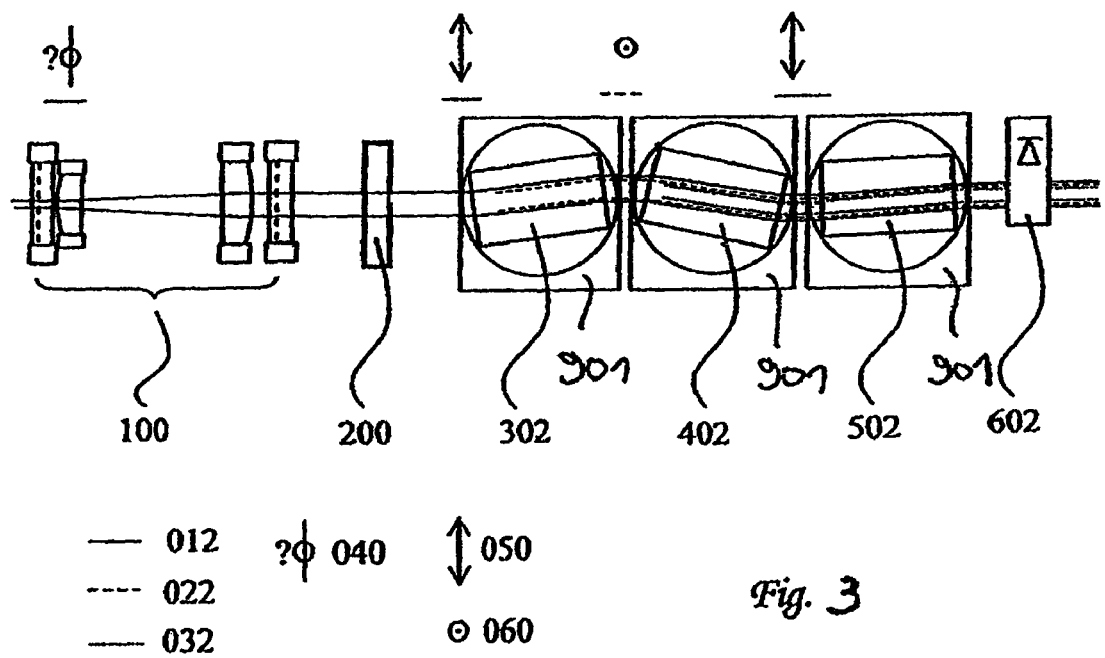
FIG. 3 shows a third example of an arrangement according to the present invention in plan view.
Figure 4:
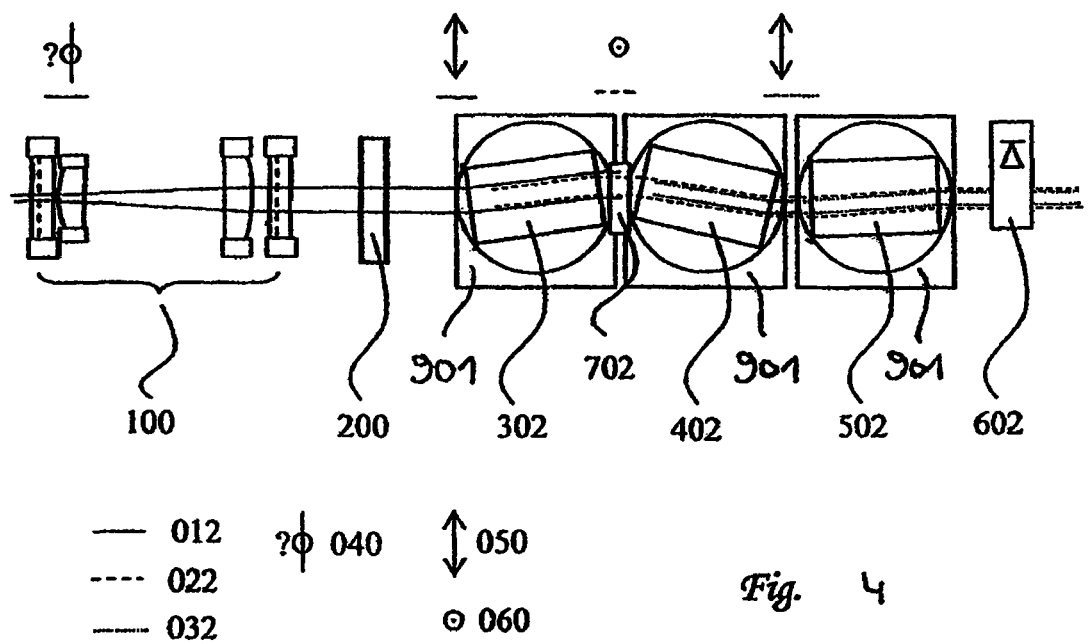
FIG. 4 shows a fourth example of an arrangement according to the present invention in plan view.

FIGS. 3 and 4 show examples for a frequency quadrupling of the fundamental radiation. In these arrangements the following conversion scheme is used:

SHG type I (eeo) and FHG type I (ooe):
(820-1000) nm|e>+(820-1000) nm|e>→(410-500) nm|o>
(410-500) nm|o>+(410-500) nm|o>→(205-250) nm|e>

Here too the geometrical arrangement with input optics 100, polarisation rotator 200, the crystals 302, 402, the compensator 502 and the power measuring unit 602 is again geometrically very similar, or identical, to the arrangement of FIGS. 1 and 2. The arrangement differs essentially in terms of the second crystal 402, which is designed for a frequency doubling of the radiation already doubled from the first crystal 302. A polarisation rotator 200 can be used to alter the polarisation 040 of the incident fundamental radiation 012, such that in the doubler crystal 302 only an extraordinary wave 050 is present, if this is not already the case a priori. The radiation generated at the doubled frequency 022 already has the correct polarisation state 060 for the subsequent quadrupling step.

In this embodiment an optical element 702, in particular a filter, can be fitted between the two crystals (cf. FIG. 4) to separate the residual radiation at the fundamental frequency from the frequency-doubled radiation before entry into the quadrupler crystal 402, since only the frequency-doubled radiation is required in order to generate the frequency-quadrupled radiation 032.

For the beam shaping during a frequency quadrupling analogous principles apply as in the case of a frequency tripling. In particular the same imaging optics 100 can be used both for a frequency tripling and a frequency quadrupling.

Figure 5:
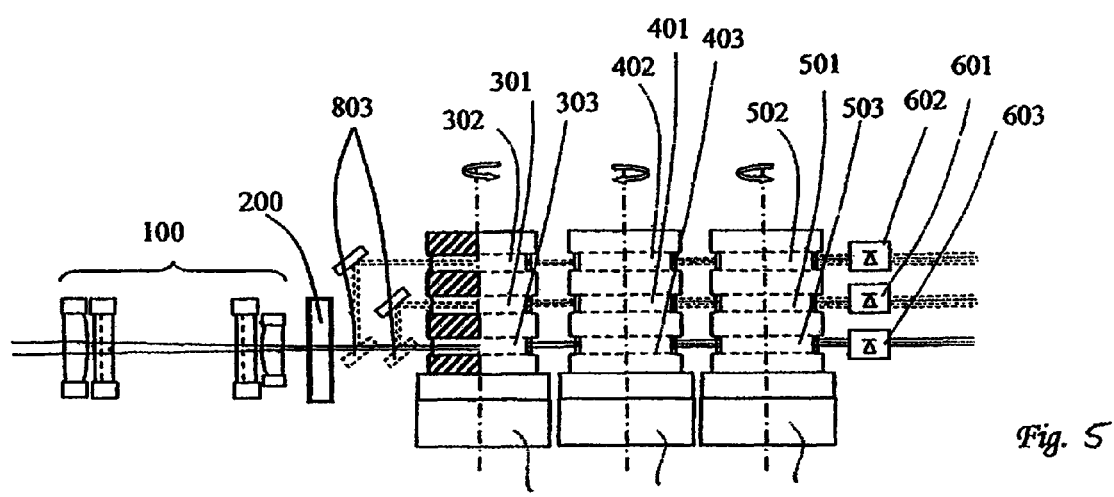
FIG. 5 shows a fifth example of an arrangement according to the present invention in side view.
Figure 6:
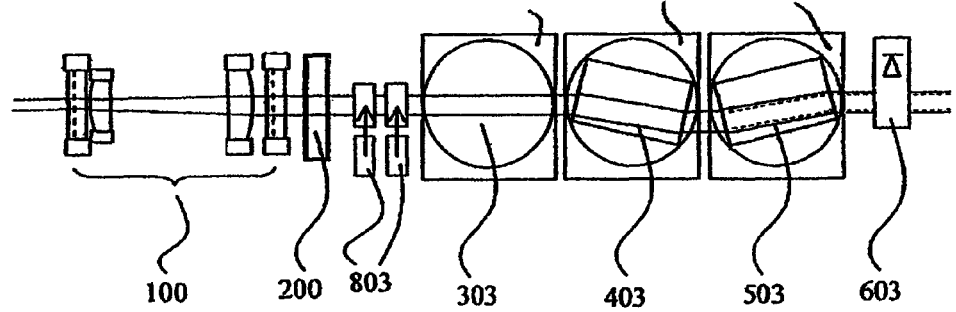
FIG. 6 shows the exemplary arrangement according to FIG. 5 in plan view.

The arrangements for a frequency tripling (FIG. 1 or 2) and a frequency quadrupling (FIG. 3 or 4) can advantageously be combined in a single structure, as schematically represented in FIGS. 5 and 6. To this end the crystals for both processes, i.e. a frequency tripling and a frequency quadrupling, are fitted in two planes lying one above the other on the same turntable 901. In addition an arrangement for purposes of doubling can also be arranged in a third plane on this same turntable 901.

A converter arrangement of this kind with three planes is schematically indicated in a side view in FIG. 5. For pure frequency doubling only a doubler crystal 403 and a compensator 503 are in principle required, while the position of a further non-linear crystal 303 can remain unoccupied. Alternatively, however, a further non-linear crystal 303 can also be introduced at this position, wherein the two crystals in this plane, i.e. the crystals 303 and 403, can then be doubler crystals for different wavelength ranges, so that the angular range required for a phase matching for each of the two crystals can advantageously be reduced.

In the example represented in FIG. 5 the lowest plane thus shows two doubler crystals 303, 403 for different wavelengths, the central plane shows the two crystals 301, 401 for a frequency tripling, and the highest plane shows the crystals 302, 402 for a frequency quadrupling.

Advantageously a separate unit is utilised for purposes of performance monitoring 601, 602, 603 in each plane, on the basis of which a controlled adjustment of the polarisation rotator 200 and the phase matching angle takes place.

As materials for the frequency quadrupling process BIBO is a candidate for the first crystal and BBO for the second crystal. BIBO, KDP, BBO, LBO (lithium triborate) and CLBO can be deployed as the material for the doubler crystal 303, 403 in the lowest plane.

In the utilisation of common imaging optics 100 for all three conversion processes the separations between the planes, their arrangement and the distances between the axes of rotation can be selected such that the beam waist lies in each plane either in one of the non-linear crystals or in the region between two crystals. Separate imaging optics can also, of course, be utilised for each conversion process for purposes of efficiency optimisation with some loss of simplicity and compactness of the arrangement.

A switchable arrangement for purposes of beam deflection 803, in the form of hinged mirrors, for example, guides the fundamental radiation according to the desired wavelength either into the frequency doubling plane, the frequency tripling plane, or into the frequency quadrupling plane.

On a third turntable 901 passive dielectric materials in cuboid shapes can be arranged as compensators (501 to 503) for any residual beam displacement behind the conversion stages. Here the required adjustment angle for these compensators as a function of output wavelength can also, as already stated for the previous examples of embodiment, be controlled by a table of values either analytically calculated or determined from measurements, or can be actively controlled in combination with a position-sensitive sensor.

The whole arrangement of a frequency doubling, a frequency tripling, and a frequency quadrupling, which is represented once again in FIG. 6 in plan view, after frequency conversion provides continuous cover for the wavelength range between 205 nm and 510 nm in a usable tuning range for the fundamental laser between 680 nm and 1020 nm. With the arrangement of a plurality of frequency converters one above another the polarisation rotator 200 is required to alter the polarisation of the input side radiation field, if different orientations of the polarisation of the fundamental radiation field are required in each case in the respective doubler crystals for efficient operation.

REFERENCE SYMBOL LIST

011/012 fundamental radiation
021/022 frequency-doubled radiation
032 frequency-tripled radiation
032 frequency-quadrupled radiation
040 input polarisation of the fundamental radiation
050 extraordinary polarisation
060 ordinary polarisation
100 input optics
200 polarisation rotator
301/302/303 first crystal (doubler crystal)
401 second crystal (tripler crystal)
402 second crystal (quadrupler crystal)
403 further crystal for purposes of a frequency doubling 501/502/503 compensator
601/602/603 power measuring unit
702 filter
803 switchable arrangement for purposes of beam deflection
901 turntable

The invention claimed is:

1. A method for the frequency conversion of coherent optical radiation with an adjustable wavelength,
in which an output frequency of the radiation is converted by way of a two-stage non-linear optical process into a higher frequency, in that a frequency doubling is carried out in a first conversion step in a first non-linear optical crystal (301, 302), and a sum frequency generation or a frequency doubling is carried out in a second non-linear optical crystal (401, 402) in a second conversion step, wherein
the radiation is coupled into the first non-linear optical crystal (301, 302) such that at least one extraordinary wave of the output frequency propagates in the crystal (301, 302),
a positively birefringent crystal is used as the first non-linear optical crystal (301, 302), in which a frequency doubling takes place with a type I phase matching from the extraordinary wave at the output frequency according to the <eeo> conversion scheme, such that an ordinary wave is generated at the doubled output frequency, and
the second non-linear optical crystal (401, 402) is selected such that a phase matching is enabled by rotation of the crystal (401, 402) in the same spatial plane in which the first non-linear optical crystal (301, 302) must also be rotated for phase matching.

2. The method according to claim 1,
in which the radiation is coupled into the first non-linear optical crystal (301, 302), such that both an ordinary and also an extraordinary wave of the output frequency propagate in the crystal (301, 302), and in the second non-linear optical crystal (401, 402) with a type I phase matching a sum frequency is generated from the ordinary wave of the output frequency and the ordinary wave of the doubled output frequency according to the <ooe> conversion scheme.

3. The method according to claim 1,
in which in the second non-linear optical crystal (401, 402) in a type II phase matching a sum frequency is generated from the extraordinary wave of the output frequency and the ordinary wave of the doubled output frequency according to the <eoe> conversion scheme.

4. The method according to claim 1,
in which in the second non-linear optical crystal (401, 402) in a type I phase matching a frequency doubling of the ordinary wave of the doubled output frequency is carried out according to the <ooe> scheme.

5. The method according to claim 1,
in which a BIBO is deployed as the first non-linear optical crystal (301, 302).

6. The method according to claim 1,
in which principal sections of the two non-linear optical crystals (301, 302, 401, 402) are oriented in anti-parallel.

7. The method according to claim 1,
in which the two non-linear optical crystals (301, 302, 401, 402) are arranged with a separation one behind the other that is less than half the Rayleigh length of the radiation in the region of the crystals (301, 302, 401, 402).

8. The method according to claim 1,
in which a beam cross-section of the radiation with an elongated, in particular an elliptical, cross-sectional shape with one semi-axis parallel to the principal section and one semi-axis at right angles to the principal section is adjusted in the two non-linear optical crystals (301, 302, 401, 402), wherein
the semi-axis parallel to the principal section is dimensioned such that in each case the ordinary and extraordinary waves overlap over the whole length of the crystals (301, 302, 401, 402) and the size of the semi-axis at right angles to the principal section is independently optimised with regard to high intensity.

9. The method according to claim 8,
in which the beam cross-section for both non-linear optical crystals (301, 302, 401, 402) is adjusted in optics (100) located upstream of the first crystal (301, 302).

10. The method according to claim 1,
in which a ratio of the components of ordinary and extraordinary waves of the output frequency in the first crystal (301, 302) is adjusted by way of a polarisation rotator (200) located upstream of the first crystal (301, 302).

11. The method according to claim 10,
in which the ratio of the components of ordinary and extraordinary waves of the output frequency in the first crystal (301, 302) is adjusted as a function of a power and/or wavelength of the radiation such that a maximum conversion efficiency ensues at the power and/or wavelength in question.

12. The method according to claim 10,
in which an output power of frequency-converted radiation is measured downstream of the first (301, 302) and/or second crystal (401, 402) and supplied to a controller, which maximises the output power by way of control of a drive for rotation of the polarisation rotator (200), and/or of one or a plurality of drives for rotation of the first (301, 302) and/or second crystal (401, 402) for purposes of a phase matching.

13. The method according to claim 1,
for purposes of generation of coherent radiation in the wavelength range between 205 and 510 nm.

14. An arrangement for the frequency conversion of coherent optical radiation,
in which an output frequency of the radiation is converted by way of a two-stage non-linear optical process into a higher frequency, with at least
a first non-linear optical crystal (301, 302) for a frequency doubling,
a second non-linear optical crystal (401, 402) located downstream of the first non-linear optical crystal (301, 302) for a sum frequency generation or a frequency doubling,
optics located upstream of the first non-linear optical crystal (301, 302) for purposes of generation of a beam waist in the region of the two non-linear optical crystals (301, 302, 401, 402), and
in each case a rotation device (901) for purposes of rotation of the two non-linear optical crystals (301, 302, 401, 402) for a phase matching at different wavelengths of the radiation, wherein
the first non-linear optical crystal (301, 302) is a positively birefringent crystal, in which a frequency doubling can take place with a type I phase matching from an extraordinary wave at the output frequency according to the <eeo> conversion scheme, so that an ordinary wave is generated at the doubled output frequency, and the second non-linear optical crystal (401, 402) is selected such that a phase matching is enabled by rotation of the crystal (401, 402) in the same spatial plane in which the first non-linear optical crystal (301, 302) must also be rotated for phase matching.

15. The arrangement according to claim 14,
in which a polarisation rotator (200) is located upstream of the first crystal (301, 302), with which a ratio of the components of ordinary and extraordinary waves of the output frequency in the first non-linear optical crystal (301, 302) can be adjusted.

16. The arrangement according to claim 14,
in which the principal sections of the two non-linear optical crystals (301, 302, 401, 402) are oriented in anti-parallel.

17. The arrangement according to claim 14,
in which the two non-linear optical crystals (301, 302, 401, 402) are arranged one behind the other without any optical elements interposed.

18. The arrangement according to claim 14,
in which a rotatable correction unit (501, 502, 503) is arranged downstream of the second non-linear optical crystal (401, 402) for purposes of equalising out a beam displacement.

19. The arrangement according to claim 14,
in which a power measuring unit (601, 602, 603) for purposes of measuring an output power of frequency-converted radiation after the first (301, 302) and/or second crystal (401, 402), and a controller, are provided, which on the basis of a measurement signal received by the power measuring unit (601, 602, 603) controls a drive for rotation of the polarisation rotator (200) and/or of one or a plurality of drives for the rotation devices (901) for purposes of rotation of the two non-linear optical crystals (301, 302, 401, 402) such that the output power is maximised.

20. The arrangement according to claim 14,
in which the two non-linear optical crystals (301, 401) form a first conversion unit for a frequency tripling in a first plane and a second conversion unit of like kind for a frequency quadrupling in a second plane, above or below the first plane, is arranged such that in each case the first (301, 302) and the second non-linear optical crystals (401, 402) of each conversion unit form a stack and are adjustable with the same rotation device (901) for purposes of a phase matching, and in which a switchable device (803) for purposes of beam deflection between the two planes is arranged upstream of the first non-linear optical crystal (301, 302).

21. The arrangement according to claim 20,
in which at least a third non-linear optical crystal (303, 403) is arranged in a third plane for purposes of a frequency doubling, wherein
the third non-linear optical crystal (303, 403) with the first (301, 302) or second non-linear optical crystals (401, 402) forms a stack and can be adjusted with the same rotation device (901) for purposes of a phase matching, and in which the switchable device (803) is designed for beam deflection such that it can switch the radiation between the three planes for purposes of frequency conversion.

22. The arrangement according to claim 14,
which is designed for the frequency conversion of coherent optical radiation in a wavelength range and for at least one conversion process comprises a plurality of non-linear optical crystals (301-303, 401-403), which with regard to orientation and surface coating are optimised to a high conversion efficiency for smaller spectral ranges within the wavelength range, wherein
in each case a plurality of the non-linear optical crystals (301-303, 401-403) that are optimised for different smaller spectral ranges, are arranged in a plurality of planes one above the other on the same rotation device (901).

\* \* \* \* \*